United States Patent
Horikawa et al.

(10) Patent No.: US 9,512,860 B2
(45) Date of Patent: Dec. 6, 2016

(54) FLUID PRESSURE CYLINDER

(71) Applicant: Koganei Corporation, Tokyo (JP)

(72) Inventors: Akiyoshi Horikawa, Tokyo (JP); Yu Takebayashi, Tokyo (JP)

(73) Assignee: Koganei Corporation, Tokyo (JP)

( * ) Notice: Subject to any disclaimer, the term of this patent is extended or adjusted under 35 U.S.C. 154(b) by 298 days.

(21) Appl. No.: 14/300,460

(22) Filed: Jun. 10, 2014

(65) Prior Publication Data

US 2014/0366716 A1    Dec. 18, 2014

(30) Foreign Application Priority Data

Jun. 12, 2013    (JP) ................................. 2013-123651

(51) Int. Cl.
| | |
|---|---|
| F15B 15/20 | (2006.01) |
| F15B 15/14 | (2006.01) |
| F16J 10/02 | (2006.01) |

(52) U.S. Cl.
CPC ....... F15B 15/1409 (2013.01); F15B 15/1428 (2013.01); F16J 10/02 (2013.01)

(58) Field of Classification Search
CPC .... F15B 11/036; F15B 11/0365; F15B 11/13
See application file for complete search history.

(56) References Cited

U.S. PATENT DOCUMENTS

| | | | | |
|---|---|---|---|---|
| 3,474,710 A | * | 10/1969 | Stryker | F15B 15/1438 92/128 |
| 3,875,365 A | | 4/1975 | Beneteau | |
| 4,216,700 A | * | 8/1980 | Iida | F15B 11/0365 91/170 R |
| 5,507,218 A | * | 4/1996 | Lipinski | F15B 15/082 92/88 |
| 5,586,482 A | * | 12/1996 | Leonard | F15B 11/036 92/62 |
| 5,701,800 A | * | 12/1997 | Kaup | F15B 15/1438 92/128 |
| 6,283,011 B1 | * | 9/2001 | Assumel-Lurdin | F15B 11/0365 92/134 |
| 7,107,814 B2 | * | 9/2006 | Winterhalter | F15B 11/0365 29/243.53 |
| 7,836,816 B2 | * | 11/2010 | Tokumoto | F16J 10/02 92/128 |

(Continued)

FOREIGN PATENT DOCUMENTS

| | | |
|---|---|---|
| CN | 202132310 U | 2/2012 |
| DE | 9111366 U1 | 12/1991 |
| EP | 0464202 A1 | 1/1992 |

(Continued)

OTHER PUBLICATIONS

Japanese Office Action for Application No. 2013-123651 dated Feb. 26, 2015.

(Continued)

*Primary Examiner* — Michael Leslie
(74) *Attorney, Agent, or Firm* — McCormick, Paulding & Huber LLP

(57) ABSTRACT

An object of the present invention is to provide a fluid pressure cylinder improved in assembling performance so as to easily fix a partition wall to a cylinder main body. A plurality of pistons 15a and 15b are incorporated in a cylinder main body 11, axially aligned with each other, reciprocable in an axial direction, and respectively provided with piston rods 17a and 17b. A partition wall 14 is attached to the cylinder main body 11 so as to form pressure chambers 21a and 21b. A stopper space is formed by an engagement groove 31 provided to the partition wall 14 and a slit 32 formed so as to extend in a transverse direction of the cylinder main body 11. A stopper 34 is inserted in the stopper space in the transverse direction of the cylinder main body 11 so as to fix the partition wall 14 to the cylinder main body 11.

7 Claims, 12 Drawing Sheets

(56) References Cited

U.S. PATENT DOCUMENTS 8,037,682 B2 * 10/2011 Yi .................... B66C 13/066
60/469

2004/0010899 A1 1/2004 Winterhalter et al.

FOREIGN PATENT DOCUMENTS

| EP | 0786599 A2 | 7/1997 |
|----|------------|--------|
| EP | 0997647 A1 | 5/2000 |
| GB | 925087 A | 5/1963 |
| JP | S48-14117 | 4/1973 |
| JP | S52-24192 U | 2/1977 |
| JP | 61233208 | 10/1986 |
| JP | H1061609 A | 3/1998 |
| JP | H10318213 A | 12/1998 |
| JP | 2001-124012 A | 5/2001 |

OTHER PUBLICATIONS

Japanese Patent Application Publication No. 47-9368, corresponding to U.S. Pat. No. 3,875,365.
European Search Report for corresponding Application No. EP14171794.2 dated Sep. 1, 2014.
Chinese Office Action dated Mar. 4, 2016 for Application No. 201410250709.7.

\* cited by examiner

FLUID PRESSURE CYLINDER

CROSS-REFERENCE TO RELATED APPLICATION

The present application claims priority from Japanese Patent Application No. 2013-123651 filed on Jun. 12, 2013, the content of which is hereby incorporated by reference into this application.

TECHNICAL FIELD OF THE INVENTION

The present invention relates to a fluid pressure cylinder in which a plurality of pistons is coaxially incorporated in a cylinder main body.

BACKGROUND OF THE INVENTION

As examples of a fluid pressure cylinder in which a plurality of pistons is coaxially incorporated in a cylinder main body, a thrust-force increasing type configured to apply a thrust force from a plurality of pistons to a piston rod, a multi-position type configured to selectively place a protruding end of a piston rod provided to a piston in a plurality of positions, a double-rod type configured to cause a piston rod provided to a piston to protrude from both ends of a cylinder main body, and the like are known.

A fluid pressure cylinder having a plurality of pistons, as just described, can be assembled by connecting, by bolts, a plurality of cylinder members each having a piston incorporated therein. However, in a case where bolts are used for connecting the cylinder members, it is necessary to provide, on the outside in a radial direction of a cylinder hole, attachment holes to which bolts are attached so as to extend in an axial direction, the cylinder main body is significantly increased in outer diameter in comparison with the cylinder hole, and the cylinder main body cannot be reduced in radial size. Therefore, it is not necessary to form attachment holes for bolts, by incorporating a plurality of pistons in a single cylinder main body, the cylinder main body can be reduced in radial size.

A fluid pressure cylinder in which a plurality of pistons is incorporated in a single cylinder main body is disclosed in, for example, Patent document 1 (Japanese Examined Utility Model Application Publication No. S48-14117), Patent document 2 (Japanese Utility Model Application Publication No. S52-24192), Patent document 3 (Japanese Unexamined Patent Application Publication No. H10-61609), and Patent document 4 (Japanese Unexamined Patent Application Publication No. S61-233208). Patent documents 1 and 2 each discloses a fluid pressure cylinder which has two pistons and in which the thrust force to be applied to piston rods is increased by applying fluid pressures to the pistons. Patent Document 3 discloses a fluid pressure cylinder which has three pistons and in which the thrust force to be applied to piston rods is increased by applying fluid pressures to the pistons. Patent Document 4 discloses a multi-position type fluid pressure cylinder in which pistons are provided in pressure chambers formed on respective sides of a partition wall, a first piston rod provided to one of the pistons so as to protrude from one end of the cylinder main body, and a second piston rod provided to the other of the pistons so as to interlock with the first piston rod.

In order to incorporate a plurality of pistons in a single cylinder main body, a plurality of pressure chambers are formed in the cylinder main body; therefore, a dividing wall, i.e., a partition wall for separating pressure chambers from each other are attached to the cylinder main body. In order to fix the partition wall to the cylinder main body, in the fluid pressure cylinder disclosed in Patent Document 2 or 4, the partition wall is fastened to the cylinder main body by screw members. In order to fasten the partition wall to the cylinder main body by the screw members in this manner, it is necessary to cause screw holes of the partition wall and the attachment holes of the cylinder main body to axially aligned with each other with the partition wall being inserted in the cylinder main body, and this cylinder encounters a problem that the attachment operation of the screw members cannot be easily carried out.

In the fluid pressure cylinder disclosed in Patent Document 3, a cylinder liner, i.e., a sleeve for positioning and fixing the partition wall is inserted in a cylinder main body. However, if the sleeve is used for positioning and fixing the partition wall, this cylinder encounters a problem that the number of parts is increased.

Furthermore, in the fluid pressure cylinder disclosed in Patent Document 1, a concave groove is formed on the outer peripheral surface of the partition wall, and a concave groove is formed on the inner peripheral surface of the cylinder main body so as to correspond to that of the partition wall. In an annular space formed by both concave grooves, a rod-like ring key is inserted from a through hole provided on the cylinder main body. However, in order to insert the rod-like ring key from the through hole provided on the cylinder main body, it is necessary to rotate the partition wall so as to correspond to the inserted ring key, it takes time to carry out this inserting operation, and it is difficult to form the concave groove on the inner peripheral surface of the cylinder main body.

It is therefore an object of the present invention to provide a fluid pressure cylinder improved in assembling performance so as to easily fix, to a cylinder main body, a partition wall for forming pressure chambers.

SUMMARY OF THE INVENTION

A fluid pressure cylinder according to the present invention, comprises: a cylinder main body in which a plurality of pistons provided with piston rods is incorporated, axially aligned with each other, and reciprocable in an axial direction; a partition wall which is attached to the cylinder main body so as to form pressure chambers, to which fluid is supplied, between the partition wall and the pistons; a stopper space which is formed by an engagement part provided to the partition wall and a slit formed so as to open to the outside and extend in a transverse direction of the cylinder main body; and a stopper which is inserted in the stopper space so as to fix the partition wall to the cylinder main body.

The slit corresponding to the engagement part formed on the outer peripheral surface of the partition wall is formed so as to open to the outside and extend in a transverse direction of the cylinder main body. The stopper space is formed by the slit and an engagement groove. The partition wall is fixed to the cylinder main body by the stopper inserted in the stopper space. In this manner, the partition wall can be easily fixed by the inserting operation of the stopper in the cylinder main body in the transverse direction. Therefore, the fixing operation of the partition wall for separating the pressure chambers in the cylinder main body can be easily carried out. As a result, the fluid pressure cylinder can be improved in assembling performance. Furthermore, since it is not necessary to form attachment holes for bolts, the cylinder main body can be reduced in outer diameter.

DESCRIPTION OF THE PREFERRED EMBODIMENTS

Hereinafter, embodiments of the present invention will be described in detail with reference to the drawings. Note that the common elements on the drawings are denoted by the same reference mark.

Figure 1:
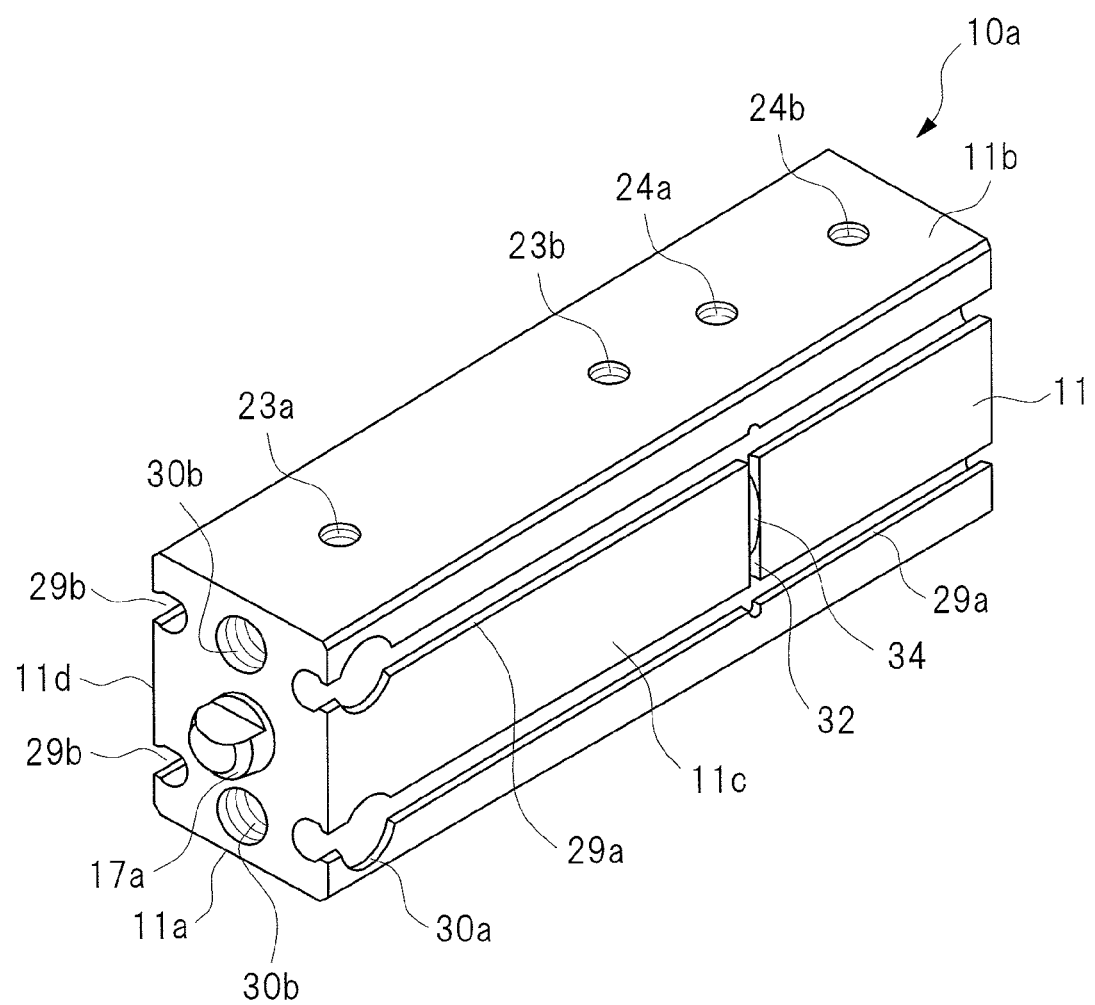
FIG. 1 is a perspective view showing an outline of a fluid pressure cylinder according to one embodiment of the present invention.
Figure 2:
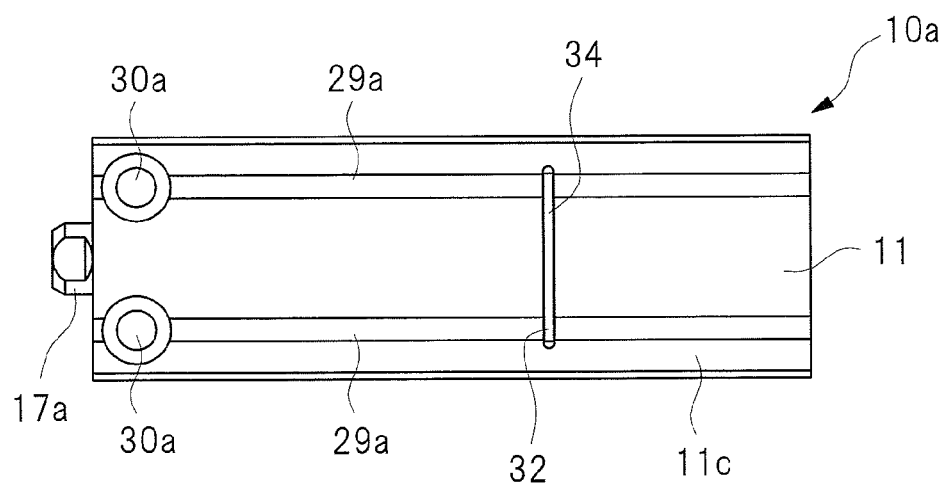
FIG. 2 is a front view of FIG. 1.
Figure 3:
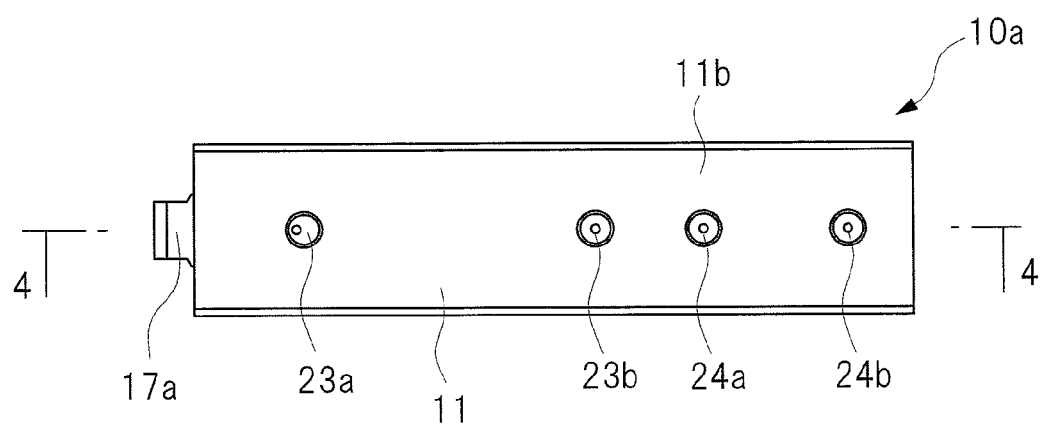
FIG. 3 is a plan view of FIG. 1.
Figure 4:
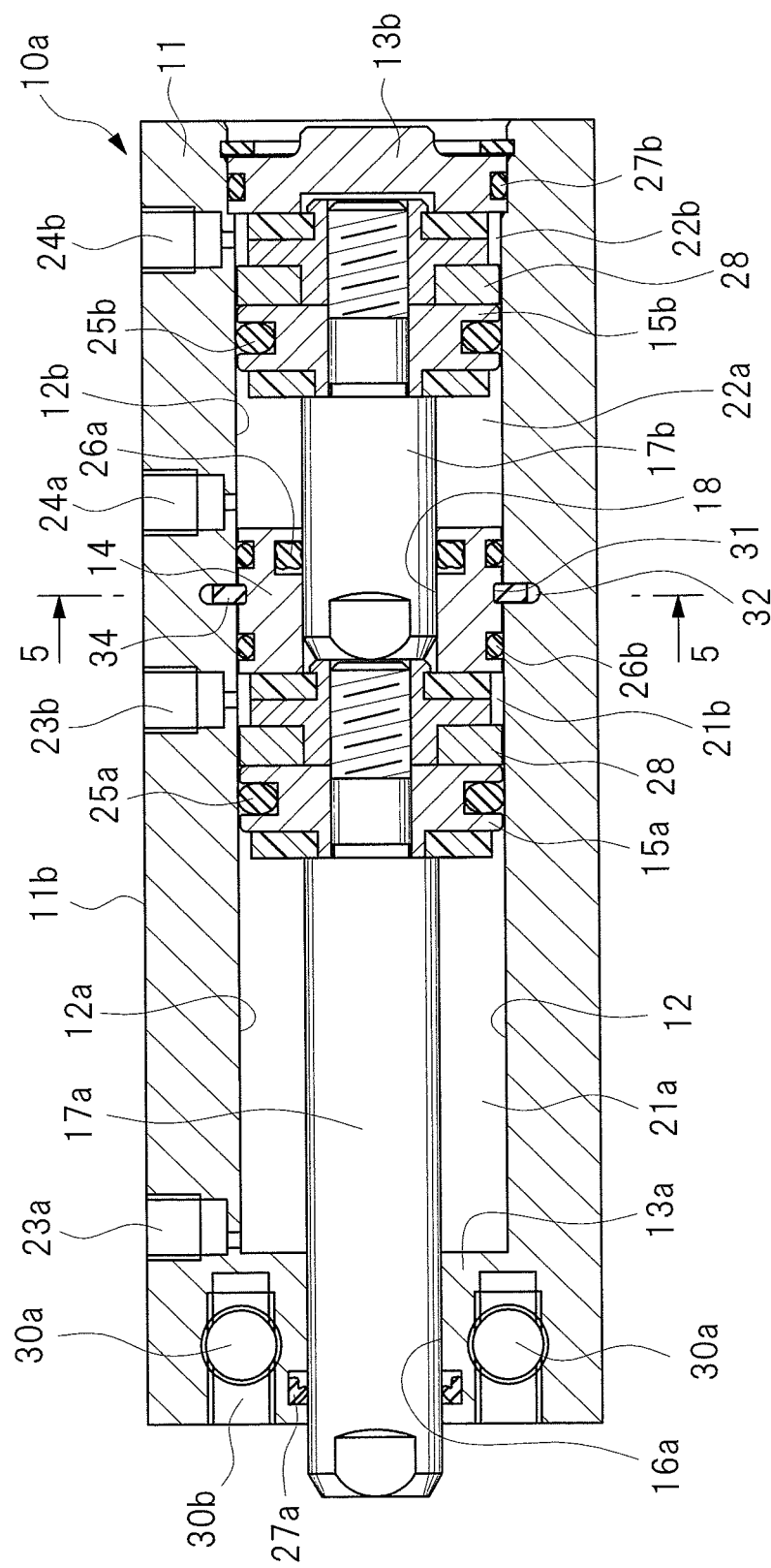
FIG. 4 is a sectional view taken along a line 4-4 in FIG. 3.
Figure 5:
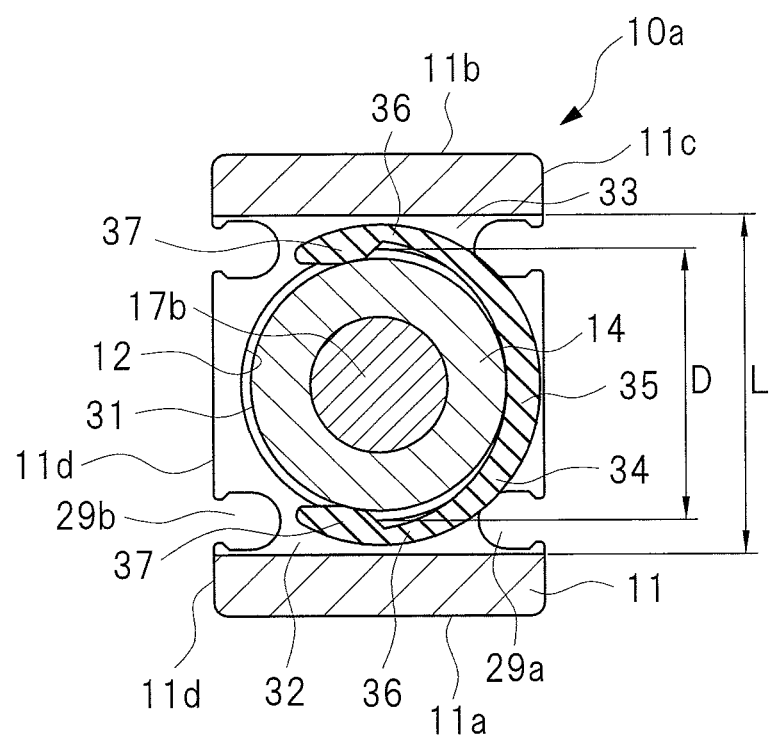
FIG. 5 is a sectional view taken along a line 5-5 in FIG. 4.
Figure 6:
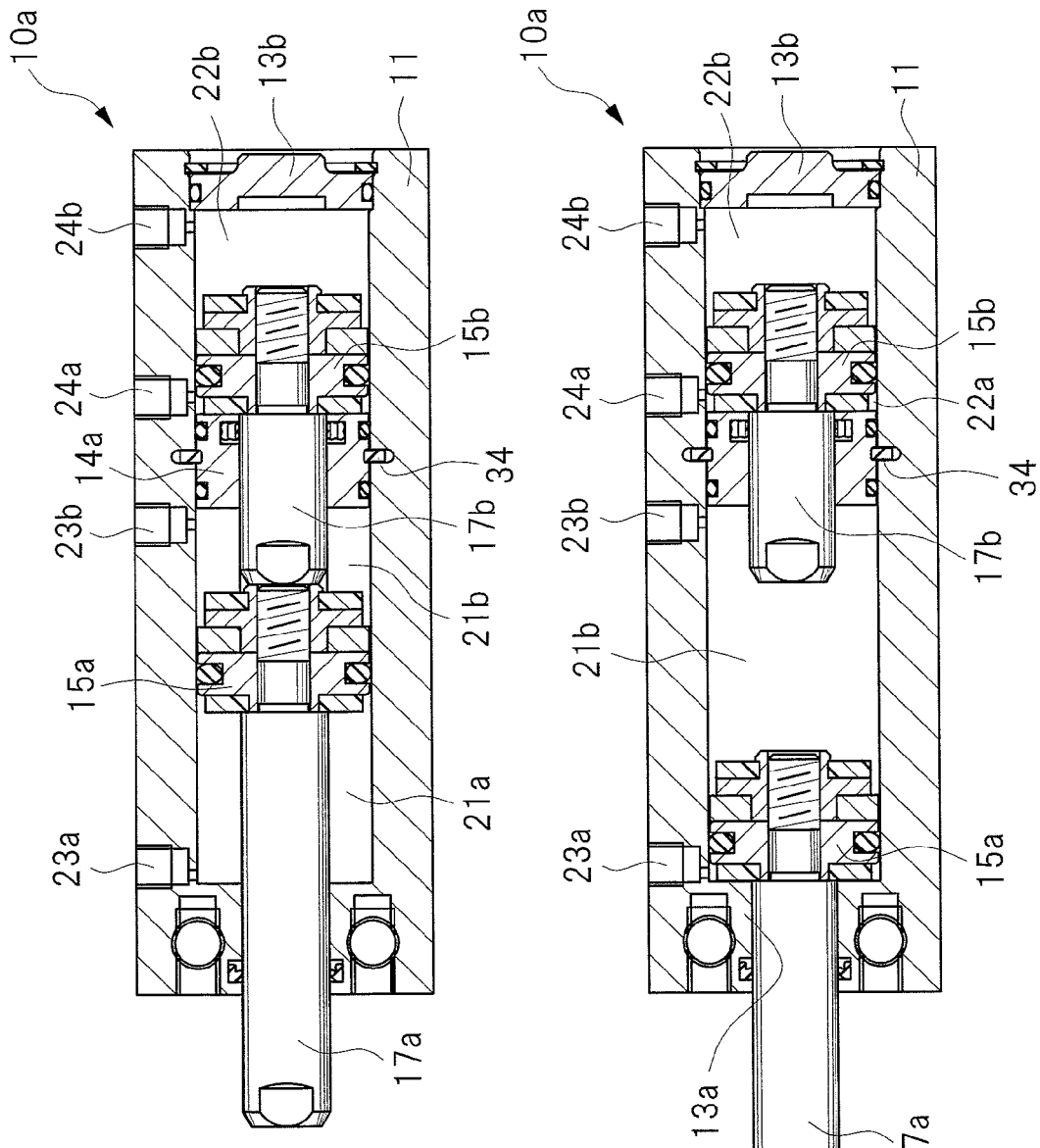
FIG. 6A is a sectional view showing a protruded state of a piston rod moved to an intermediate position.
FIG. 6B is a sectional view showing a state of the piston rod moved forward to a projection limit position.

FIGS. 1 to 6 show a fluid pressure cylinder 10a according to one embodiment, and the fluid pressure cylinder 10a has a cylinder main body 11. As shown in FIG. 1, the cylinder main body 11 has: a bottom surface 11a; a top surface 11b; and front and rear side surfaces 11c and 11d, and the cylinder main body 11 has an approximately quadrangular shape in cross section. As shown in FIG. 5, the cylinder main body 11 is provided with a cylinder hole 12 which has a circular shape in cross section. As shown in FIG. 4, the cylinder hole 12 is closed by a first cover 13a, which serves as a rod cover integrally provided to one end of the cylinder main body 11, and a second cover 13b, which serves as a head cover attached to the other end of the cylinder main body 11. Additionally, the first cover 13a may be attached to the cylinder main body 11 as well as the second cover 13b without being integrally provided to the cylinder main body 11.

A dividing wall, i.e., a partition wall 14 is attached to the cylinder main body 11. This partition wall 14 has a circular outer peripheral surface fitted in the cylinder hole 12, and the cylinder hole 12 is divided into a first cylinder hole 12a and a second cylinder hole 12b by the partition wall 14. A first piston 15a is attached to the first cylinder hole 12a and reciprocable in an axial direction. The first piston 15a is provided with a first piston rod 17a which extends through a through hole 16a of the first cover 13a. The first piston 15a is moved between a position in which the first piston 15a abuts on the first cover 13a and a position in which the first piston 15a abuts on the partition wall 14. When the first piston 15a abuts on the cover 13a, the piston rod 17a takes a projection limit position. On the other hand, when the first piston 15a abuts on the partition wall 14, the piston rod 17a takes a backward limit position. In this manner, the first piston 15a reciprocates the piston rod 17a between the projection limit position and the backward limit position.

A second piston 15b is attached to the second cylinder hole 12b, axially aligned with the first piston 15a, and reciprocable in the axial direction. The second piston 15b is provided with a second piston rod 17b which extends through a through hole 18 of the partition wall 14. The second piston rod 17b is axially aligned with the first piston rod 17a. The second piston 15b is reciprocable between a position in which the second piston 15b abuts on the partition wall 14 and a position in which the second piston 15b abuts on the second cover 13b. When the second piston 15b abuts on the partition wall 14, the second piston rod 17b protrudes from the partition wall 14 into the cylinder hole 12a provided on one end side of the cylinder main body 11, and the first piston rod 17a is moved via the second piston rod 17b to an intermediate position, i.e., a position defined between the projection limit position and the backward limit position.

The cylinder hole 12a is partitioned into a pressure chamber 21a and a pressure chamber 21b by the first piston 15a. The pressure chamber 21a is formed by the first piston 15a and the cover 13a, and the pressure chamber 21b is formed by the first piston 15a and the partition wall 14. On the other hand, the cylinder hole 12b is partitioned into a pressure chamber 22a and a pressure chamber 22b by the second piston 15b. The pressure chamber 22a is formed by the partition wall 14 and the second piston 15b, and the pressure chamber 22b is formed by the second piston 15b and the second cover 13b.

The cylinder main body 11 is formed with a supply and discharge port 23a which communicates with the pressure chamber 21a, and this supply and discharge port 23a is used for the supply of compressed air to the pressure chamber 21a and the discharge of compressed air from the pressure chamber 21a. The cylinder main body 11 is formed with a supply and discharge port 23b which communicates with the pressure chamber 21b, and this supply and discharge port 23b is used for the supply of compressed air to the pressure chamber 21b and the discharge of compressed air from the pressure chamber 21b. Similarly, the cylinder main body 11 is formed with a supply and discharge port 24a which communicates with the pressure chamber 22a, and this supply and discharge port 24a is used for the supply of compressed air to the pressure chamber 22a and the discharge of compressed air from the pressure chamber 22a. The cylinder main body 11 is formed with a supply and discharge port 24b which communicates with the pressure chamber 22b, and this supply and discharge port 24b is used for the supply of compressed air to the pressure chamber 22b and the discharge of compressed air from the pressure chamber 22b. Each of the supply and discharge ports 23a to 24b opens on the top surface 11b of the cylinder main body 11 shown in FIG. 1.

As shown in FIG. 4, the pistons 15a and 15b are provided with respective seal members 25a and 25b. Seal members 26a and 26b are provided in respective annular grooves provided on inner and outer peripheral surfaces of the partition wall 14. The covers 13a and 13b are also provided with respective seal members 27a and 27b.

FIG. 4 shows a state of the first piston rod 17a moved to the backward limit position by the supply of compressed air from the supply and discharge port 23a. At this point, the second piston rod 17b abuts on a rear end surface of the first piston rod 17a, and the second piston 15b is moved back to a position in which the second piston 15b abuts on the second cover 13b. When compressed air is supplied from the supply and discharge port 24b to the pressure chamber 22b with the first piston rod 17a taking the backward limit position, as shown in FIG. 6A, the second piston 15b is moved to a position in which the second piston 15b abuts on the partition wall 14, and the second piston rod 17b protrudes from the partition wall 14 into the pressure chamber 21b toward one end of the cylinder main body 11. The first piston rod 17a is moved to the intermediate position defined between the projection limit position and the backward limit position by the second piston rod 17b moved so as to protrude. At this point, compressed air in the pressure chamber 21a is discharged to the outside from the supply and discharge port 23a.

On the other hand, by the supply of compressed air from the supply and discharge port 23b to the pressure chamber 21b, as shown in FIG. 6B, the first piston 15a is moved to a position in which the first piston 15a abuts on the first cover 13a, and the first piston rod 17a is moved to the projection limit position. As seen from the above, the fluid pressure cylinder 10a is a multi-position type in which the piston rod 17a is moved to the projection limit position, the backward limit position, and the intermediate position between them.

In order to detect each position of the pistons 15a and 15b, as shown in FIG. 4, the pistons 15a and 15b are provided with magnets 28, and sensor attachment grooves 29a and 29b, to which magnetic sensors (not shown) for sensing magnetism of the magnets 28 are attached, are provided on the front and rear side surfaces 11c and 11d of the cylinder main body 11 as shown in FIG. 1. One end of the cylinder main body 11 is provided with attachment holes 30a extending so as to penetrate the side surfaces 11c and 11d. The cylinder main body 11 is attached to a supporting base (not shown), which abuts on the side surface 11d, by screw members (not shown) attached to these attachment holes 30a. Furthermore, the cylinder main body 11 is provided with attachment holes 30b which open on one end surface thereof. The cylinder main body 11 is attached to a supporting base (not shown), which abuts on this end surface, by screw members (not shown) attached to these attachment holes 30b.

An annular engagement groove 31 is provided as an engagement part to the outer peripheral surface of the partition wall 14 shown in FIG. 5, and the cylinder main body 11 is formed with a slit 32 extending in a transverse direction of the cylinder main body 11 and corresponding to this engagement groove 31. The slit 32 extends between the front and rear side surfaces 11c and 11d of the cylinder main body 11, and opens to the outside, and a width "L" thereof in a direction approximately orthogonal to the penetrating direction is set to be larger than the outer diameter "D" of the partition wall 14. Therefore, as shown in FIG. 5, in the cylinder main body 11, the slit 32 is formed so as to entirely surround the outside of the engagement groove 31 of the partition wall 14, and a stopper space 33 is formed by the slit 32 and the engagement groove 31.

A stopper 34 is inserted in the stopper space 33 in the transverse direction of the cylinder main body 11. By entering the stopper 34 into the engagement groove 31 and the slit 32, the partition wall 14 is fixed to the cylinder main body 11. As shown in FIG. 5, the stopper 34 has leg portions 36 extending in a circumferential direction along the engagement groove 31 from a center portion 35, and has a C-shape. The stopper 34 is made of a spring member such as spring steel, and is elastically deformable in a radial direction thereof. Each of the leg portions 36 has a tip provided with a protruding portion 37 which is meshed with the engagement groove 31. When the stopper 34 is inserted in the stopper space 33, since the protruding portions 37 are on the same side as the side surface 11d in comparison with the center of the partition wall 14, the stopper 34 is prevented from falling.

In order to fix the partition wall 14 to the cylinder main body 11 by the C-shaped stopper 34, the stopper 34 is pushed into the slit 32 from one side of the side surfaces 11c and 11d with the partition wall 14 being positioned at the position of the slit 32. At this point, it is possible to easily visually check, from the outside, whether the engagement groove 31 is located so as to correspond to the position of the slit 32 or not. When the stopper 34 is pushed into the slit 32, the protruding portions 37 of the leg portions 36 are brought into contact with a bottom surface of the engagement groove 31, the stopper 34 is elastically deformed in the radial direction so that the leg portions 36 get away from each other, and the stopper 34 is inserted in the stopper space 33. As a result, an inner peripheral portion of the stopper 34 is engaged with the engagement groove 31, and the partition wall 14 is fixed to the cylinder main body 11. In the fixed state, the inner peripheral surface of the center portion 35 of the stopper 34 and the inner peripheral surfaces of the protruding portions 37 are in contact with the bottom surface of the engagement groove 31. In this manner, the partition wall 14 can be easily fixed to the cylinder main body 11 by an inserting operation of the stopper 34 into the stopper space 33 in the transverse direction of the cylinder main body 11, and the fluid pressure cylinder 10a can be improved in assembling performance.

Figure 7:
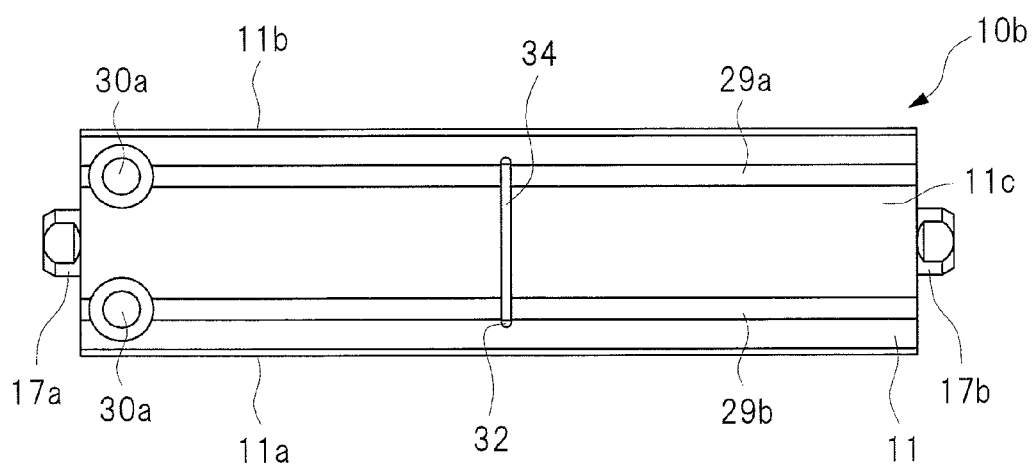
FIG. 7 is a front view showing a fluid pressure cylinder according to another embodiment.
Figure 8:
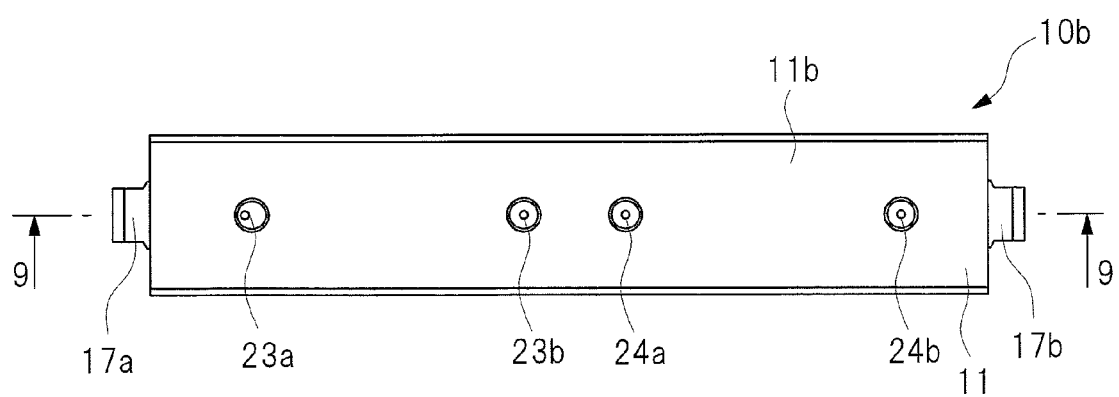
FIG. 8 is a plan view of FIG. 7.
Figure 9:
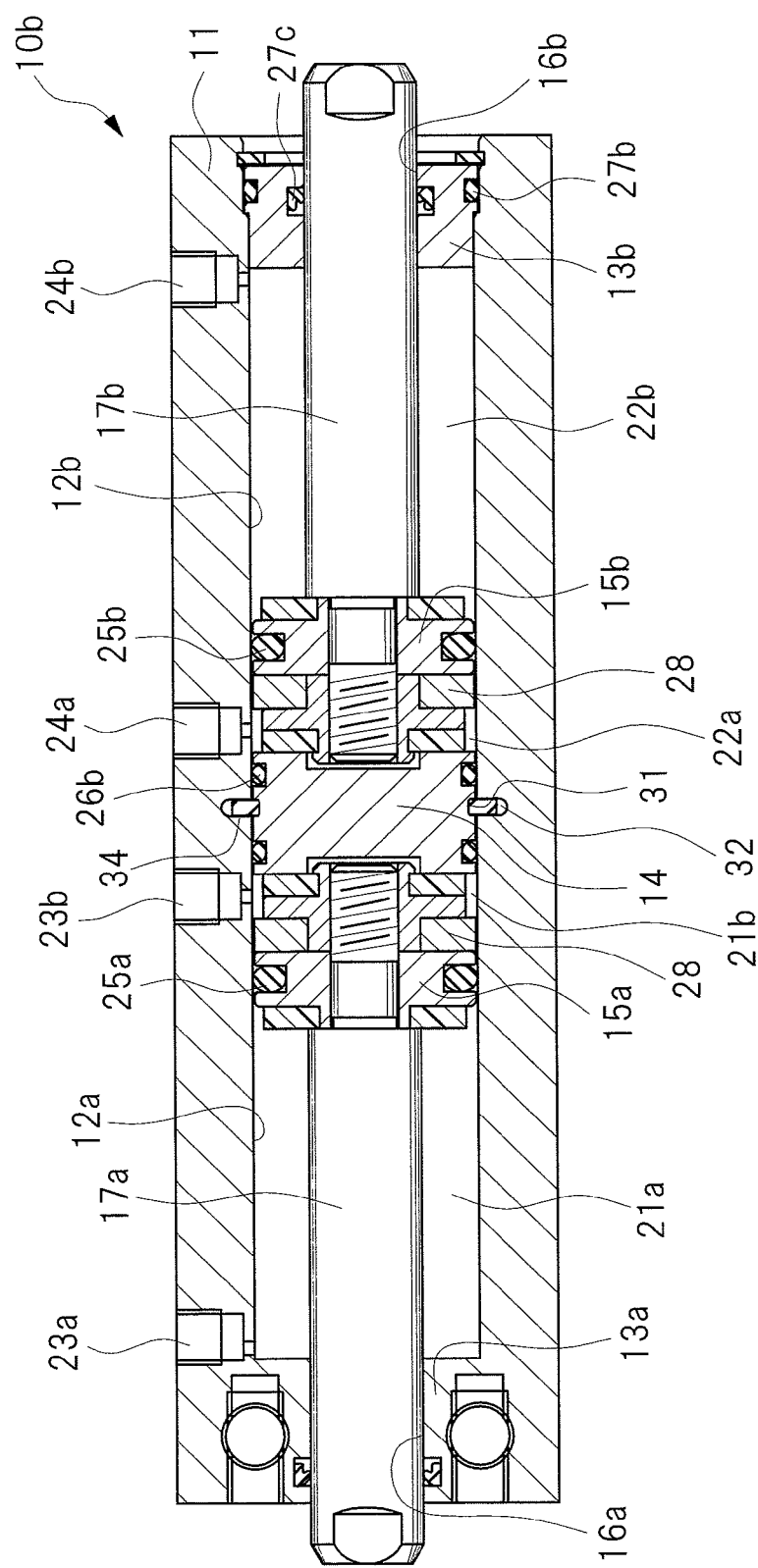
FIG. 9 is a sectional view taken along a line 9-9 in FIG. 8.

FIG. 7 is a front view showing a fluid pressure cylinder according to another embodiment, FIG. 8 is a plan view of FIG. 7, and FIG. 9 is a sectional view taken along a line 9-9 in FIG. 8.

A fluid pressure cylinder 10b shown in FIGS. 7 to 9 is a double-rod type, while the above described fluid pressure cylinder is a multi-position type. As shown in FIG. 9, as well as the above described fluid pressure cylinder 10a, the cylinder main body 11 has: the first cylinder hole 12a formed between the partition wall 14 and the first cover 13a; and a second cylinder hole 12b formed between the partition wall 14 and the second cover 13b. The first piston 15a is attached to the first cylinder hole 12a and reciprocable in the axial direction, and the first piston rod 17a extending through the through hole 16a of the first cover 13a is provided to the first piston 15a. The first piston 15a is movable between a position in which the first piston 15a abuts on the first cover 13a and a position in which the first piston 15a abuts on the partition wall 14. When the first piston 15a abuts on the first cover 13a, the first piston rod 17a takes the projection limit position. On the other hand, when the first piston 15a abuts on the partition wall 14, the first piston rod 17a takes the backward limit position. Therefore, as well as the above described fluid pressure cylinder 10a, the first piston 15a reciprocates the piston rod 17a between the projection limit position and the backward limit position.

The second piston 15b is received in the second cylinder hole 12b, axially aligned with the first piston 15a, and reciprocable in the axial direction, and the second piston rod 17b extending through a through hole 16b of the second cover 13b is provided to the second piston 15b. The second piston 15b is movable between a position in which the second piston 15b abuts on the second cover 13b and a position in which the second piston 15b abuts on the partition wall 14. When the second piston 15b abuts on the second cover 13b, the second piston rod 17b takes a projection limit position. On the other hand, when the second piston 15b abuts on the partition wall 14, the second piston rod 17b takes a backward limit position. Therefore, in the fluid pressure cylinder 10b, the piston rods 17a and 17b are configured to protrude from respective ends of the cylinder main body 11. The partition wall 14 is not provided with a through hole 18, and differs from that of FIG. 4. The second cover 13b is provided with a seal member 27c for sealing a gap between the second piston rod 17b and the second cover 13b.

The partition wall 14 of the above described fluid pressure cylinder 10a is provided with a through hole 18, while the partition wall 14 of the fluid pressure cylinder 10b shown in FIGS. 7 to 9 is not provided with a through hole 18, but the partition wall 14 shown in FIG. 9 is fixed to the cylinder main body 11 by the stopper 34 as well as the above described fluid pressure cylinder 10a.

Therefore, a stopper 34 is inserted in a stopper space 33 in the transverse direction of the cylinder main body 11 as well at that of FIG. 5, by entering the stopper 34 into the engagement groove 31 and the slit 32, the partition wall 14 is fixed to the cylinder main body 11. As shown in FIG. 5, the stopper 34 has leg portions 36 extending in a circumferential direction along the engagement groove 31 from a center portion 35, and has a C-shape.

Figure 10:
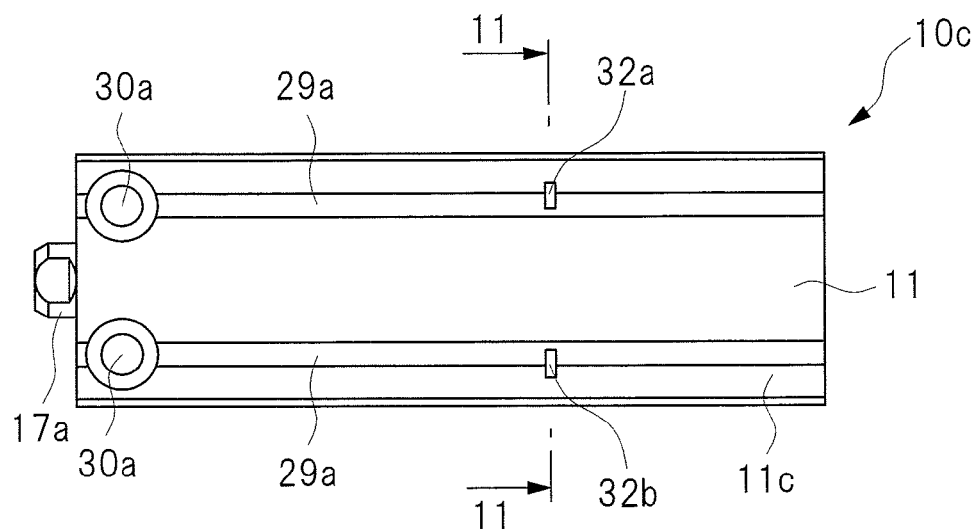
FIG. 10 is a front view showing a fluid pressure cylinder according to still another embodiment.
Figure 11:
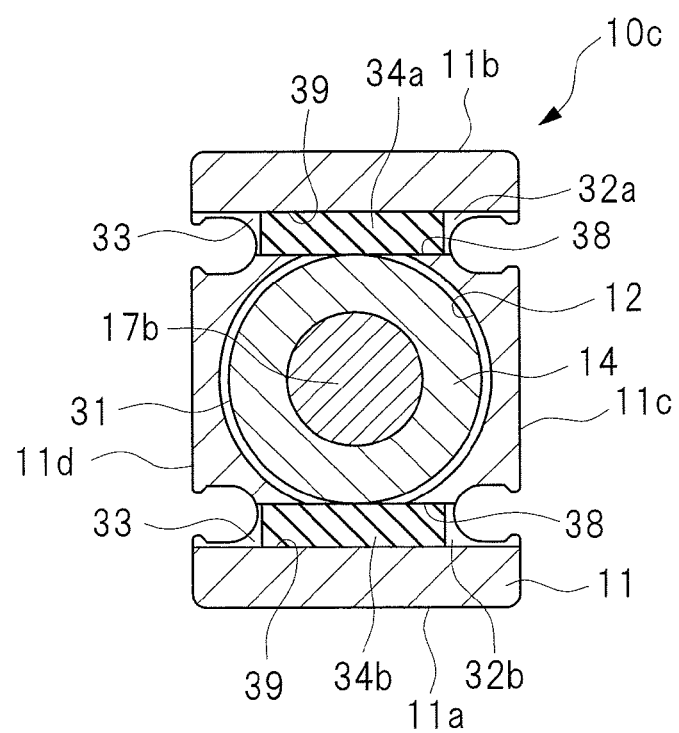
FIG. 11 is an enlarged sectional view taken along a line 11-11 in FIG. 10.

FIG. 10 is a front view showing a fluid pressure cylinder 10c according to still another embodiment, and FIG. 11 is an enlarged sectional view taken along a line 11-11 in FIG. 10. The fluid pressure cylinder 10c is a multi-position type as well as the fluid pressure cylinder 10a shown in FIGS. 1 to 3.

As shown in FIG. 11, the partition wall 14 has an outer peripheral surface provided with an annular groove 31 as well as that of FIG. 5. The cylinder main body 11 is provided with two through holes extending through the parts between the side surfaces 11c and 11d of the cylinder main body 11, and slits 32a and 32b are formed by the through holes, respectively. The slits 32a and 32b and the engagement groove 31 form two stopper spaces 33. The slits 32a and 32b respectively have engaging surfaces 38, which extend in the direction that includes tangent lines of the bottom surface of the engagement groove 31 and is transverse to the cylinder main body 11. Both of the engaging surfaces 38 are shifted from each other by approximately 180 degrees in the circumferential direction of the partition wall 14. The slits 32a and 32b are through holes which have tetragonal cross sections formed by guiding surfaces 39, which are opposed to the engaging surfaces 38, and opposing surfaces, which are formed on the cylinder main body 11 to be opposed to each other in the longitudinal direction thereof.

In the stopper spaces 33, stoppers 34a and 34b comprised of rod-like members having cross-sectional shapes corresponding to the transverse sectional shapes of the slits 32a and 32b are inserted, respectively. When the stoppers 34a and 34b are inserted, each of the stoppers 34a and 34b are sandwiched between the bottom surface of the engagement groove 31 and the guiding surface 39. By virtue of this, the partition wall 14 can be easily fixed to the cylinder main body 11 by inserting the stoppers 34a and 34b in the transverse direction of the cylinder main body 11, and the fluid pressure cylinder can be improved in assembling performance. It is also possible to employ a single stopper space and fix the partition wall 14 to the cylinder main body 11 by the single stopper.

Figure 12A:
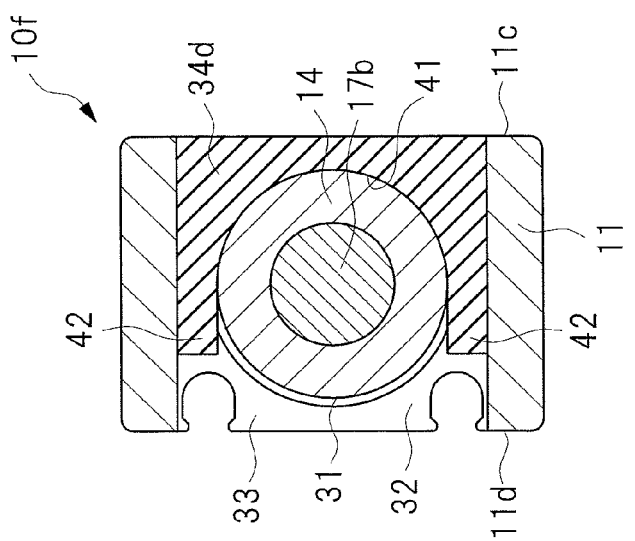
FIGS. 12A to 12C are sectional views showing respective fluid pressure cylinders according to yet another embodiments.
Figure 12B:
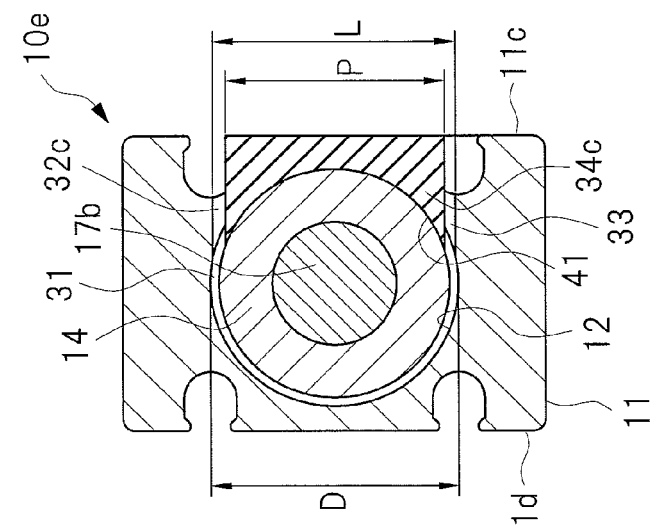
Figure 12C:
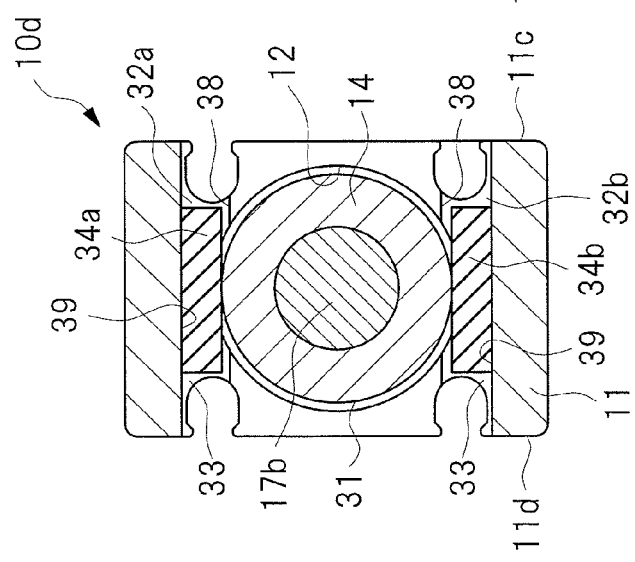

FIGS. 12A to 12C are sectional views showing respective fluid pressure cylinders 10d to 10f according to yet another embodiments, and this part is the same as that of FIG. 11.

The stoppers 34a and 34b of the fluid pressure cylinder 10c shown in FIG. 11 contact the respective engaging surfaces 28, while the stoppers 34a and 34b of the fluid pressure cylinder 10d shown in FIG. 12A does not contact not the engaging surfaces 38. That is, each width of the stoppers 34a and 34b is smaller than the distance between the guiding surface 39 and the engaging surface 38. As shown in the figures, each stopper is sandwiched between the bottom surface of the engagement groove 31 and the guiding surface 39.

In the fluid pressure cylinder 10e shown in FIG. 12B, a slit 32c is formed on the cylinder main body 11 to be open to the side surface 11c in one side, and the slit 32c is not penetrating through the cylinder main body 11 in the transverse direction. A stopper space 33 is formed by the slit 32c and the engagement groove 31, and a stopper 34c attached to the stopper space 33 is formed of a block member, which is provided with an arc surface 41 to be in contact with the bottom surface of the engagement groove 31. When the stopper 34c is inserted in the stopper space 33, the arc surface 41 is brought into contact with the bottom surface of the engagement groove 31. The width dimension of the slit 32c in the top-bottom direction in FIG. 12B is L, the width dimension of the stopper 34c is P, and the inner diameter of the cylinder hole 12 is D; in this case, these dimensions are set to P≤L≤D.

The cylinder main body 11 of the fluid pressure cylinder 10f shown in FIG. 12C is formed with a slit 32 similar to that of the fluid pressure cylinder 10a shown in FIG. 5, and the slit 32 entirely surrounds the outer periphery of the engagement groove 31 of the partition wall 14. A stopper 34d attached to a stopper space 33 is formed of a block member provided with the arc surface 41 as well as the stopper 34c shown in FIG. 12B. The stopper 34d has leg portions 42 extending in the direction transverse of the cylinder main body 11. The lengths of the leg portions 42 may be longer than those in the case shown in FIG. 12C so that the tips of the leg portions 42 are at the positions of the side surface 11d. In FIG. 12C, the tips of the leg portions 42 are retracted to inside of the cylinder main body 11 with respect to the side surface 11d; therefore, the left part of the cylinder main body 11 with respect to the tip surfaces of the leg portions 42 in FIG. 12C may not be provided with the slit 32.

Figure 13:
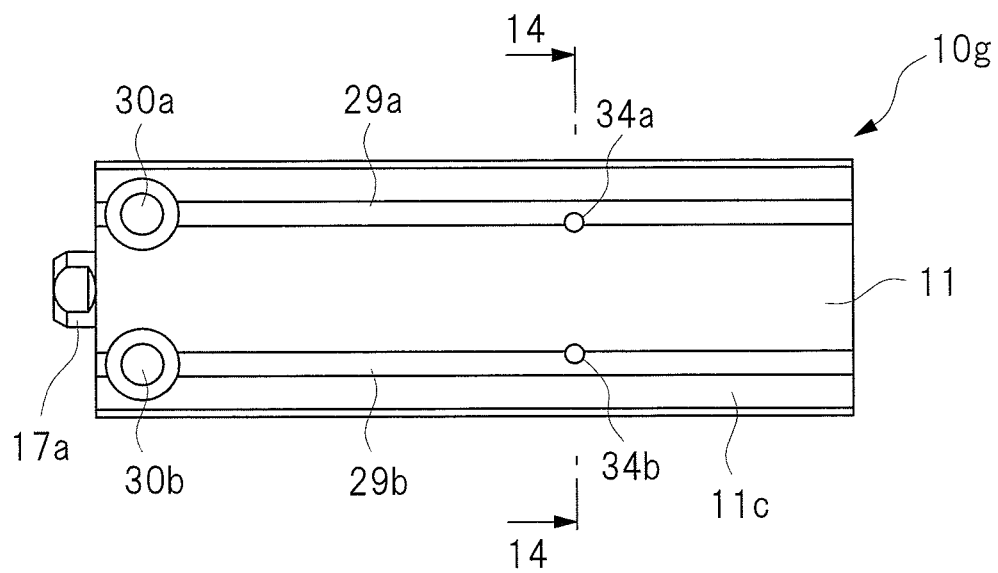
FIG. 13 is a front view showing a fluid pressure cylinder according to further embodiment.
Figure 14:
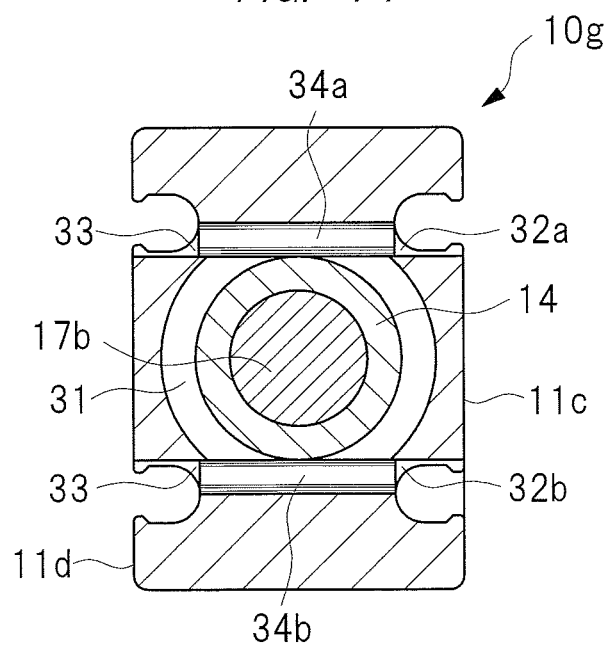
FIG. 14 is an enlarged sectional view taken along a line 14-14 in FIG. 13.

FIG. 13 is a front view showing a fluid pressure cylinder according to further embodiment, and FIG. 14 is an enlarged sectional view taken along a line 14-14 in FIG. 13. Each of the stoppers 34a and 34b of the fluid pressure cylinder 10c shown in FIGS. 10 and 11 has a quadrangular shape in cross section, while each of the stoppers 34a and 34b of the fluid pressure cylinder 10g shown in FIGS. 13 and 14 has a circular shape in cross section.

Figure 15:
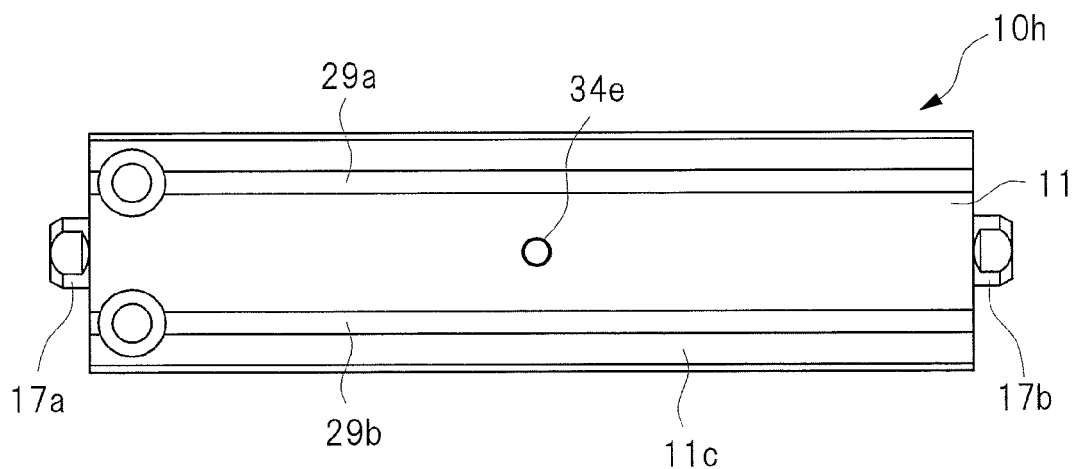
FIG. 15 is a front view showing a fluid pressure cylinder according to still further embodiment.
Figure 16:
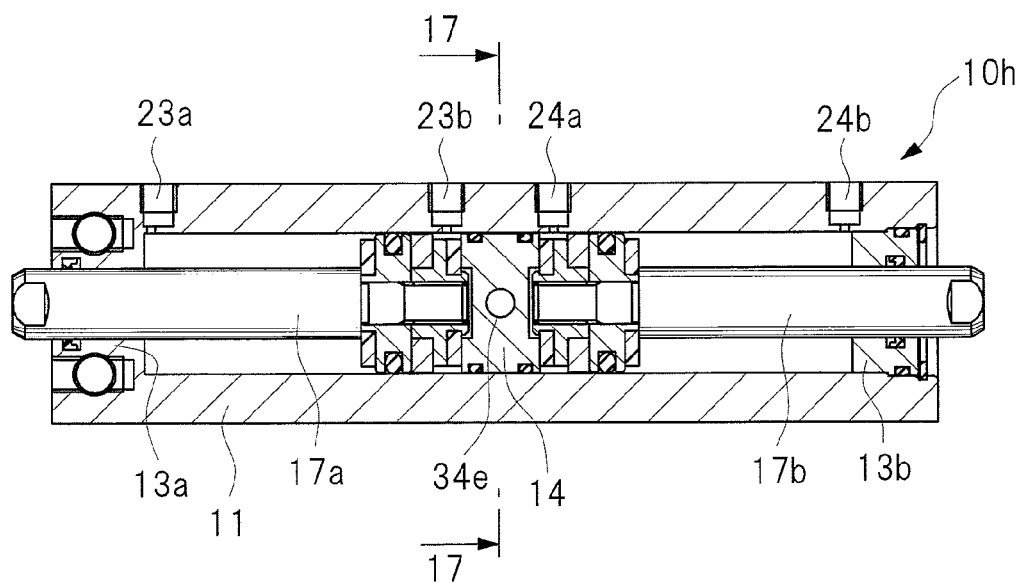
FIG. 16 is a longitudinal sectional view of FIG. 15.
Figure 17:
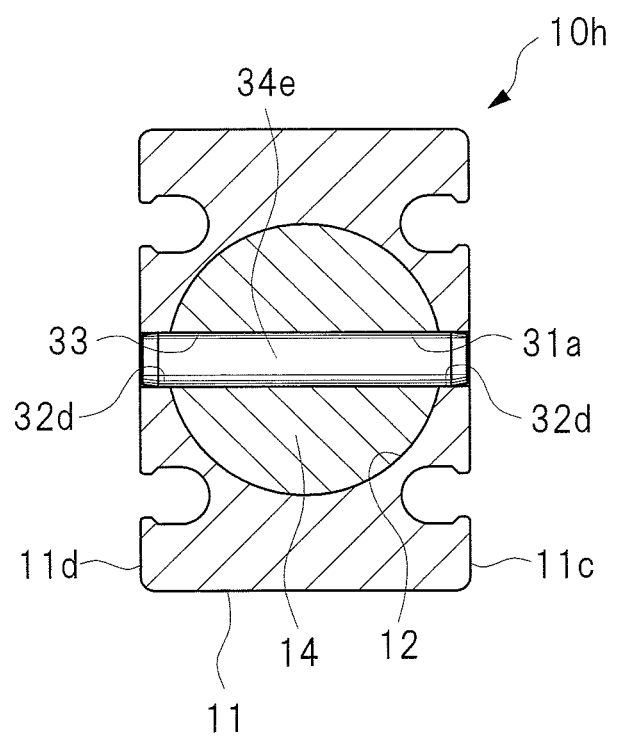
FIG. 17 is an enlarged sectional view taken along a line 17-17 in FIG. 16.

FIG. 15 is a front view showing a fluid pressure cylinder according to still further embodiment, FIG. 16 is a longitudinal sectional view of FIG. 15, and FIG. 17 is an enlarged sectional view taken along a line 17-17 in FIG. 16.

This fluid pressure cylinder 10h is a double-rod type as well as the fluid pressure cylinder 10b shown in FIGS. 7 to 9, the first piston rod 17a protrudes from one end of the cylinder main body 11 to the outside, and the second piston rod 17b protrudes from the other end of the cylinder main body 11 to the outside.

The partition wall 14 is provided with an engagement hole 31a which is extending in a radial direction as an engagement part. This engagement hole 31a extends through a center part of the partition wall 14 in the radial direction. The cylinder main body 11 is provided with a slit 32d corresponding to the engagement hole 31a. The slit 32d is an attachment hole which opens to the cylinder hole 12 and the side surfaces 11c and 11d, and the cylinder hole 12 and the outside communicates with each other via the attachment hole defined as the slit 32d. A stopper space 33 is formed by the slit 32d and the engagement hole 31a, and a stopper 34e composed of a rod-like member is inserted in the stopper space 33. When the stopper 34e is inserted in the stopper space 33, the partition wall 14 can be easily fixed to the cylinder main body 11, and the fluid pressure cylinder can be improved in assembling performance.

The stopper 34e has a circular shape in transverse cross section, but a quadrangular rod-like member may be used as the stopper 34e. Furthermore, although the partition wall 14 is provided with the engagement hole 31a which extends through the partition wall 14 in the radial direction, but the partition wall 14 may be provided with a bottomed engagement hole 31a. In this case, the slit 32d is formed so as to open only on one side surface of the cylinder main body.

In each of the fluid pressure cylinders 10a to 10h, the partition wall 14 is attached to the cylinder main body 11, the pressure chamber 21b is formed in the cylinder main body 11 by the partition wall 14 and the first piston 15a adjacent to the partition wall 14 in the axial direction, and the pressure chamber 22a is formed in the cylinder main body 11 by the partition wall 14 and the second piston 15b adjacent to the partition wall 14 in the axial direction. A fluid pressure cylinder having a partition wall 14 forming pressure chambers 21b and 22a may be a multi-position type in which, as show in FIG. 4, the second piston rod 17b extends through the partition wall 14 so as to position the first piston rod 17a at the intermediate position between the projection limit position and the backward limit position. Furthermore, a fluid pressure cylinder may be a double-rod type in which, as shown in FIGS. 9 and 16, the piston rods 17a and 17b protrude from both ends of the cylinder main body 11. In each case, the partition wall 14 can be easily attached by the stopper. The fluid pressure cylinder can be improved in assembling performance by attaching the partition wall 14 by using the stopper.

The present invention is not limited to the above described embodiments, and various modifications can be made within a range not departing from the gist thereof. For example, the cylinder main body 11 may be longer than that of FIG. 4, and further have a partition wall between the first piston 15a and the second cover 13b, and a piston between the partition wall and the second cover 13b, thereby having two intermediate positions. In a case where the second piston rod 17b extends through the through hole 18 of the partition wall 14 as shown in FIG. 4, if the second piston rod 17b is coupled to the piston rod 17a, the piston rod 17a can be driven by the compressed air supplied to the plurality of pressure chambers. In this fluid pressure cylinder, it is possible to increase the thrust force to be applied to the piston rod 17a without increasing the pressure of the compressed air, and this fluid pressure cylinder is called "thrust-force increasing type".

What is claimed is:

1. A fluid pressure cylinder, comprising:
   a cylinder main body having a cylinder hole in which a plurality of pistons provided with piston rods is incorporated, the pistons being axially aligned with each other, and reciprocable in an axial direction, the cylinder main body having an inner surface forming the cylinder hole;
   a partition wall which is attached in the cylinder hole of the cylinder main body so as to form pressure chambers, to which fluid is supplied, between the partition wall and the pistons, wherein the partition wall has an outer peripheral surface facing the inner surface of the cylinder main body, the outer peripheral surface being provided with a circular engagement groove;
   a stopper space which is formed by the circular engagement groove provided on the outer peripheral surface of the partition wall and a slit extending in a transverse direction of the cylinder main body, surrounding the engagement groove, and penetrating the cylinder main body to open to the outside; and
   a stopper which is inserted in the stopper space via the slit so as to fix the partition wall to the cylinder main body, wherein the slit has a width larger than an inner diameter of the cylinder hole.

2. The fluid pressure cylinder according to claim 1, wherein
   the slit extends through the cylinder main body in the transverse direction,
   the stopper has a C-shape, and the stopper has an inner peripheral portion which is engaged with the engagement groove of the partition wall, and
   the stopper is elastically deformable in a radial direction.

3. The fluid pressure cylinder according to claim 1, wherein the stopper is a rod-like member which is engaged with the engagement groove.

4. The fluid pressure cylinder according to claim 1, wherein the stopper is a block member provided with an arc surface which is engaged with the engagement groove.

5. The fluid pressure cylinder according to claim 1, further comprising:
   a first piston provided with a first piston rod which extends through a first cover provided to one end of the cylinder main body, and adapted to move the first piston rod between a projection limit position in which the first piston abuts on the first cover and a backward limit position in which the first piston abuts on the partition wall; and
   a second piston provided with a second piston rod which extends through the partition wall and moves the first piston rod, the second piston abuts on the partition wall and moves the first piston rod to an intermediate position between the projection limit position and the backward limit position via the second piston rod.

6. The fluid pressure cylinder according to claim 1, further comprising:
   a first piston which is provided with a first piston rod extending through a first cover provided to one end of the cylinder main body, and in which the first piston rod is movable between a projection limit position in which the first piston abuts on the first cover and a backward limit position in which the first piston abuts on the partition wall; and a second piston which is provided with a second piston rod extending through a second cover provided to the other end of the cylinder main body, and in which the second piston rod is movable between a projection limit position in which the second piston abuts on the second cover and a backward limit position in which the second piston abuts on the partition wall.

7. The fluid pressure cylinder according to claim 1, wherein the engagement groove is positioned between seal members provided on the outer peripheral surface of the partition wall.

\* \* \* \* \*